United States Patent Office

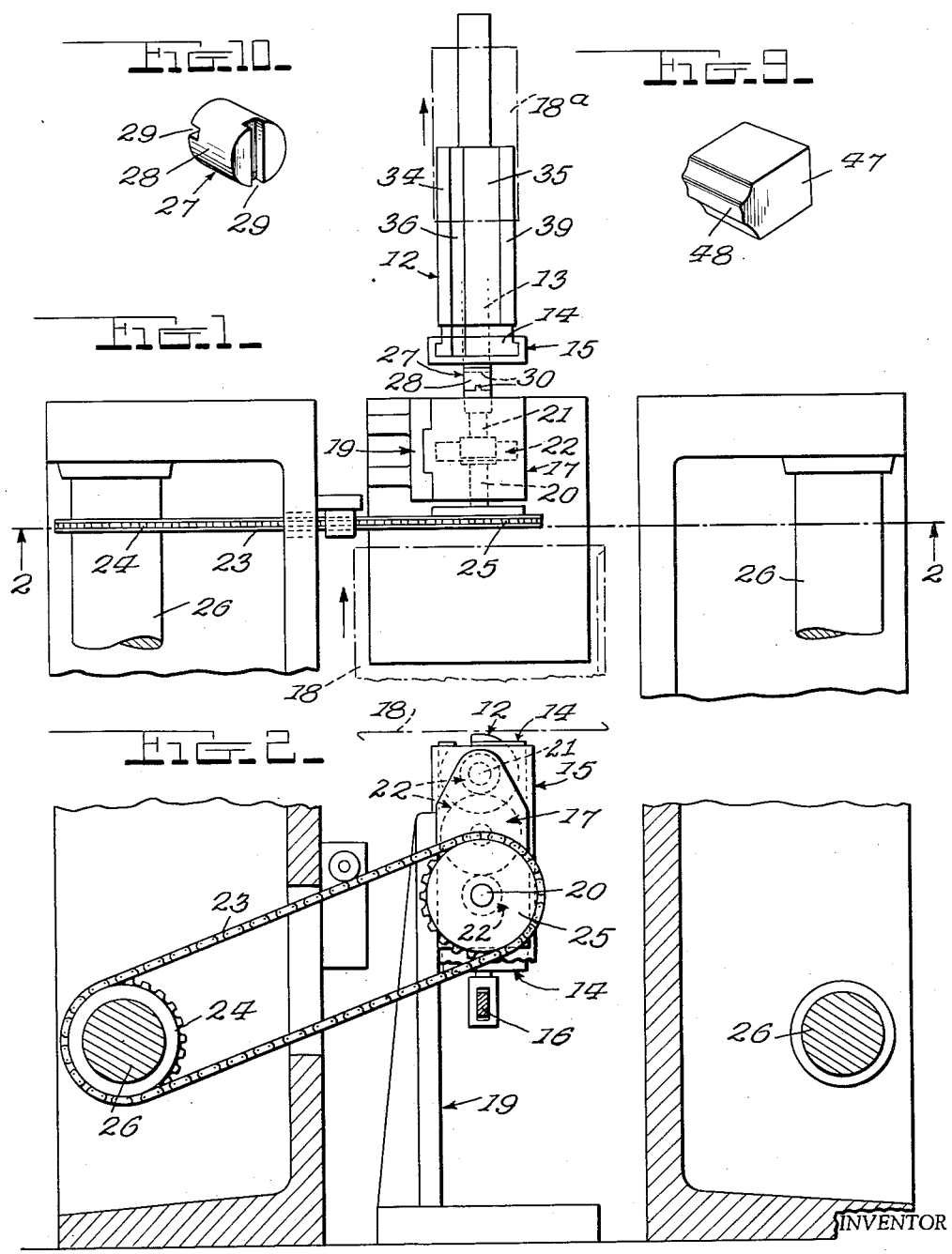

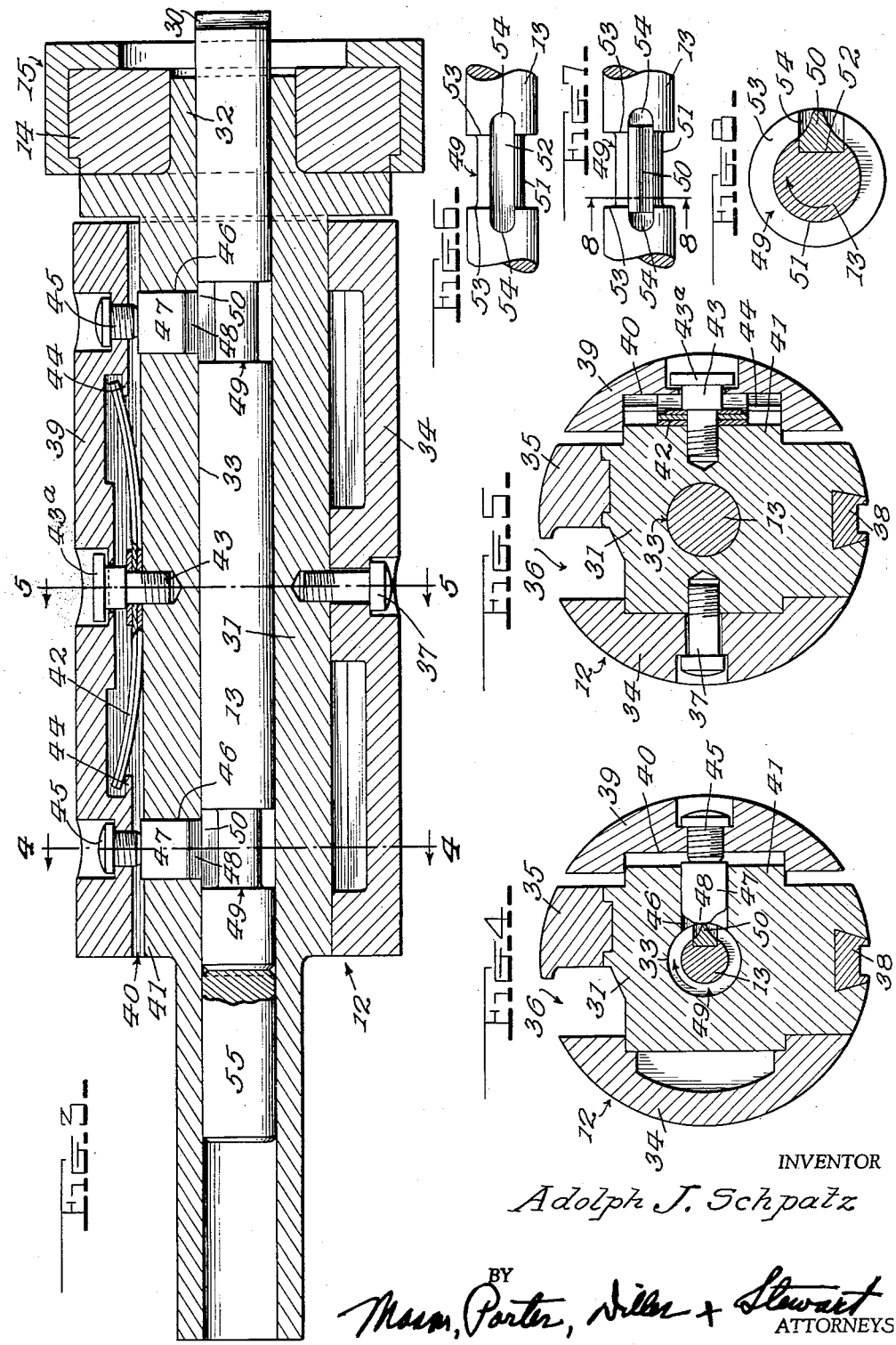

3,000,337
Patented Sept. 19, 1961

1

3,000,337
CAN BODY MAKER AND EXPANDABLE
HORN THEREFOR
Adolph J. Schpatz, Cincinnati, Ohio, assignor to Continental Can Company, Inc., New York, N.Y., a corporation of New York
Filed Jan. 20, 1958, Ser. No. 709,834
5 Claims. (Cl. 113—8)

This invention relates to can body making machines of the general type in which (1) body blanks are successively fed to a forming station and positioned over a horn while the latter occupies a lowered position; (2) the horn is raised to clamp the positioned blank against a fixed abutment; (3) the held blank is bent around the horn to shape the body; and (4) the horn is expanded to give the body the required diameter before side seaming. An example of such a machine is found in U.S. Patent 1,750,550, issued March 11, 1930, to N. Troyer et al.

In machines for making can bodies having side seams in which hook flanges are engaged and soldered, the bending of the blank around the horn brings the hook flanges into juxtaposition and the expansion of the horn expands the body to required diameter and interengages said flanges with each other. Then, a bumper moves upwardly to tightly clinch the inter-engaged flanges together, in readiness for soldering.

In machines for making can bodies having welded or soldered lap seams, the same general operations are performed except that there is no inter-engagement and bumping of hook flanges and the overlapped edges of the bent blank are at least tacked together by soldering or welding while the formed body is held at proper diameter by the expanded horn.

Ordinarily, in either instance, the horn is secured to a vertical slide for the necessary up and down movements, a fixed guide is provided for said slide, and horn expansion is effected by endwise shifting of a cam rod disposed longitudinally within the horn. Not only does this cam rod exert repeated end thrusts on the horn, tending to wear the horn carrying slide and its guide, but said rod adds to the number of machine parts which must be repeatedly moved and stopped, whereas it is desirable in any machine to reduce such start and stop elements as much as possible, to thereby decrease lost motion, vibration and noise, and to attain smoother machine operation.

The present invention has aimed to provide an improved body maker in which the horn expanding means includes a continuously driven actuating shaft rotatable within the horn, thereby dispensing with the above mentioned shiftable rod and the necessity of repeatedly shifting and stopping the same.

Another object has been to make novel provision for continuously driving the aforesaid actuating shaft without interference from the up and down movements of the horn.

A further object has been to provide a new and improved horn in which the continuously driven actuating shaft is provided with cams cooperable with radially movable slide blocks in the horn body to effect projection of a single side section of the horn, to effect horn expansion.

A still further object has been to provide the actuating shaft with circumferential grooves which normally receive the inner ends of the slide blocks, and to provide said shaft with cams disposed in said grooves.

Another object has been to provide a novel construction for the cam carrying actuating shaft, to facilitate manufacture and to permit the use of hardened cams without requiring tempering of the shaft.

With the above and other objects in view that will hereinafter appear, the nature of the invention will be more clearly understood by reference to the following detailed description, the appended claims and the several views illustrated in the accompanying drawings.

In the drawings:
FIGURE 1 is a fragmentary top view showing the mounted horn and the drive means for the actuating shaft of the horn expanding means.
FIGURE 2 is a vertical sectional view on line 2—2 of FIGURE 1.
FIGURE 3 is a horizontal sectional view through the expanded horn and the horn mounting means.
FIGURES 4 and 5 are transverse sectional views on lines 4—4 and 5—5 of FIGURE 3, respectively.
FIGURE 6 is a fragmentary elevation showing a portion of the actuating shaft before securing of a cam thereto.
FIGURE 7 is a similar view with the cam secured in place.
FIGURE 8 is a transverse sectional view on line 8—8 of FIGURE 7.
FIGURE 9 is a perspective view showing one of the slide blocks.
FIGURE 10 is a perspective view showing a coupling employed in driving the actuating shaft of the horn expanding means.

In the drawings, the expandable horn is generally designated 12 and the rotary actuating shaft for the horn expanding means is denoted at 13. The horn 12 is mounted on a slide 14 for the required up and down movements, and a fixed vertical guide 15 is provided for said slide. A portion of the slide operating means is shown at 16 in FIGURE 2. The elements 14, 15 and 16 correspond generally to the elements 41, 42 and 57 of U.S. Patent 1,750,550, above mentioned.

A drive unit 17 is spaced from the guide 15 in a direction opposite to that in which the body blanks 18 are fed, and said drive unit is disposed below the plane along which said blanks are fed. The drive unit 17 is secured to a fixed bracket 19, and while said unit drives the shaft 13 by coupling means described below, it does not move up and down with said shaft 13 as the horn 12 is raised and lowered.

The drive unit 17 includes a drive shaft 20, a driven shaft 21 and gearing 22 connecting said drive and driven shafts. The drive shaft 20 is connected by a chain 23 and sprockets 24 and 25 with one of the continuously driven side shafts 26 of the machine. The driven shaft 21 is connected by coupling means 27 with the shaft 13 and thus this shaft 13 is continuously driven.

The coupling means 27 is of such construction that it will not interfere with the up and down movements of the horn 12 and will have no interference from said movements. Preferably, this coupling means is in the form of a cylindrical body 28 having diametrical grooves 29 in its ends slidably receiving ribs 30 on the adjacent ends of the shafts 13 and 21, the two grooves 29 being angularly spaced 90°.

The shaft 13 is constantly driven whether the horn 12 be lowered to clear an advancing blank 18 or raised to clamp the blank while the latter is being bent as usual around said horn to form a can body: and at the required moments said shaft 13 effects expansion and re-contraction of said horn. The manner in which the horn expansion and re-contraction are attained will become clear as the description proceeds.

The horn 12 includes an elongated body 31 suitably secured at 32 to the slide 14, said body being formed with a longitudinal bore 33 in which the shaft 13 is rotatably received. Two horn side sections 34 and 35 are suitably secured to the body 31 and are so related therewith as to form a groove 36 to receive a conventional feed bar of the machine. A screw 37 is shown securing the side section 34 to the body 31: and the section 35 may be similarly secured.

The lower side of the body 31 carries the customary inset anvil bar 38 against which the interengaged hook flanges of each formed body are to be bumped to clinch them tightly together, when the seam is to include such hook flanges.

A radially projectable and retractable horn side section 39, commonly known as a "wing," is suitably mounted on the body 31 at the side of the latter diametrically opposite the fixed section or "wing" 34. The inner side of the section 39, in the present disclosure, is formed with a longitudinal channel 40 which receives a longitudinal rib 41 on the body 31, the relation of said channel and rib being such that the side section 39 may move radially of the body 31. A conventional bowed leaf spring 42 is shown secured by a shouldered screw 43 against the rib 41, said spring being located in the channel 40 and having its ends engaged with lugs 44 on the side section 39. The spring 42 biases the side section 39 toward the body 31: and the head 43a of the screw 43 limits outward movement of said side section 39.

Near its ends the side section 39 carries two thrust screws 45 which are located at the longitudinal center of the channel 40 and disposed radially of the horn. In radial alignment with these screws, the body 31 is formed with two four-sided openings 46 which extend from the bore 33 to the outer side of the rib 41. These openings receive hardened rectangular slide blocks 47 and the inner ends of these slide blocks are reduced to provide each block with a thrust rib 48 elongated longitudinally of the shaft 13. The outer ends of the blocks 47 abut the thrust screws 45.

The shaft 13 is reduced to provide it with two circumferential grooves 49 with which the openings 46 communicate, respectively: and in these grooves the shaft is provided with cams 50 elongated longitudinally of the horn and cooperable with the ribs 48 of the slide blocks 47.

Normally, the inner ends of the slide blocks 47 are received in the shaft grooves 49, the horn side section 39 being then held in against the body 31 by the spring 42. By the time horn expansion is required, however, the shaft 13 has rotated sufficiently to cause the cams 50 to outwardly slide the blocks 47, thereby outwardly shifting the side section 39 to effect such expansion. This horn expansion, expands the can body, then surrounding the horn, to required diameter, and before the cams 50 allow inward return of the side section 39, the overlapped edges of the can body have been secured together. As soon as horn contraction has been effected by inward movement of the side section 39, the can body 18a (FIGURE 1) is fed from the horn 12 and another body blank 18 is fed into position over said horn for bending around the latter.

In providing the shaft 13 with each of the cams 50, the construction shown in detail in FIGURES 6 to 8, is preferably employed. The shaft is recessed to provide the bottom 51 of the groove 49 with a straight shallow groove 52 extending longitudinally of the shaft, and to provide the parallel side walls 53 of said groove 49 with notches 54 at the ends of said groove 52. The inner edge of the cam 50 is secured in the shallow groove 52, the cam spans the groove 49, and the ends of said cam are secured in the notches 54. Silver solder and a sweating operation are preferably employed in securing the cam. The cam may be of tool steel or may be a carbide or other hard insert and the use of such a hardened cam, formed separately from the shaft 13, obviates the necessity of tempering the shaft.

The element 55, shown at the left of FIGURE 3, is simply a thrust bearing for the end of the shaft 13 remote from the slide 14.

While the advantages of the invention have been stressed in connection with a mounting for the horn permitting upward and downward movement thereof, it is to be understood that the invention also provides marked advantages in connection with fixedly mounted horn structures, and the invention embraces such uses within the scope of the appended claims.

From the foregoing, it will be seen that novel and advantageous provision has been disclosed for attaining the desired ends. However, attention is invited to the possibility of making variations within the scope of the invention.

I claim:

1. In a can body maker including an expandable horn around which body blanks are bent into cylindrical form, and a continuously driven member; expanding means for said horn including an actuating shaft rotatably mounted in said horn and having one of its ends disposed at one end of said horn, and one-directional rotary means for transmitting continuous driving motion in one direction from said continuously driven member to said actuating shaft.

2. In a can body maker including an expandable horn around which body blanks are bent into cylindrical form, means mounting said horn for up and down movements, and a continuously driven member; expanding means for said horn including an actuating shaft rotatably mounted in said horn and having one of its ends disposed at one end of said horn, a drive unit stationarily mounted at said one end of said horn and fixed against up and down movements with said horn, said drive unit including a rotating drive shaft and a rotating driven shaft, driving connections from the aforesaid continuously driven member to said drive shaft of said unit for continuously driving said unit, and coupling means constantly connecting the driven shaft of said unit with the aforesaid end of said actuating shaft for continuously rotating the latter in the same direction, said coupling means including provision whereby up and down movements of said actuating shaft with said horn will not affect the continuous driving of said actuating shaft.

3. In a horn for a can body maker, a horn body having an axial bore, a horn side section mounted on said body for inward and outward movement radially thereof, spring means normally biasing said horn side section inwardly toward said body, said body having radial openings spaced apart longitudinally thereof and communicating with said bore, the outer ends of said radial openings being open and disposed at the inner side of said horn side section, slide blocks received for radial sliding in said radial openings respectively, the outer ends of said slide blocks being disposed in abutting relation with said horn side section, and an actuating shaft mounted rotatably in said axial bore of said body, said shaft having circumferential grooves into which the inner webs of said slide blocks normally extend, said shaft also having cams in said grooves positioned to simultaneously slide said slide blocks outwardly once during each revolution of said shaft said radial openings and said slide blocks being formed with contacting flat sides holding said slide blocks against rotation, the inner ends of said slide blocks being each provided with a cam engaging surface including a thrust ridge elongated longitudindally of said shaft, and said cams being also elongated longitudinally of said shaft.

4. In a horn expanding means, a shaft having a reduced portion providing it with a circumferential groove, said groove having opposed side walls in parallel planes at right angles to the shaft axis, said groove also having a bottom concentric with the shaft periphery, said side walls having two opposed notches respectively, and a hardened cam elongated longitudinally of said shaft and spanning said groove, the ends of said cam being secured in said notches respectively.

5. In a horn expanding means, a shaft having a reduced portion providing it with a circumferential groove, said groove having opposed side walls in parallel planes at right angles to the shaft axis, said groove also having a bottom concentric with the shaft periphery, said bottom having a straight groove extending longitudinally of the shaft, said side walls having opposed notches communicating with the ends of said straight groove respectively, and an elongated hardened cam having an inner edge secured in said straight groove, said cam having its ends secured in said notches.

References Cited in the file of this patent
UNITED STATES PATENTS

| | | |
|---|---|---|
| 867,030 | Gardner | Sept. 24, 1907 |
| 941,076 | Jones | Nov. 23, 1909 |
| 1,750,550 | Troyer et al. | Mar. 11, 1930 |